US007729832B2

(12) United States Patent
Benckert et al.

(10) Patent No.: US 7,729,832 B2
(45) Date of Patent: Jun. 1, 2010

(54) DEVICE FOR ACTUATING AN ARTICULATED MAST

(75) Inventors: Hartmut Benckert, Filderstadt (DE); Kurt Rau, Hammersbach (DE)

(73) Assignee: Putzmeister Concrete Pumps GmbH, Aichtal (DE)

( * ) Notice: Subject to any disclaimer, the term of this patent is extended or adjusted under 35 U.S.C. 154(b) by 1203 days.

(21) Appl. No.: 10/523,083

(22) PCT Filed: Jun. 30, 2003

(86) PCT No.: PCT/EP03/06925

§ 371 (c)(1), (2), (4) Date: Feb. 2, 2005

(87) PCT Pub. No.: WO2004/020765

PCT Pub. Date: Mar. 11, 2004

(65) Prior Publication Data

US 2005/0278099 A1 Dec. 15, 2005

(30) Foreign Application Priority Data

Aug. 27, 2002 (DE) ................................ 102 40 180

(51) Int. Cl.
*G05D 3/00* (2006.01)

(52) U.S. Cl. ................................ 701/49; 701/1; 701/50; 198/657; 198/666; 198/670; 198/318; 222/526; 222/527; 222/530; 222/533; 212/276; 212/223; 212/255; 212/347

(58) Field of Classification Search ..................... 701/1, 701/50, 49; 198/657, 666, 670, 318; 222/526–527, 222/530, 533

See application file for complete search history.

(56) References Cited

U.S. PATENT DOCUMENTS 5,363,304 A * 11/1994 Awano et al. ................. 701/50

(Continued)

FOREIGN PATENT DOCUMENTS

DE 43 06 127 A 9/1994

(Continued)

*Primary Examiner*—Khoi Tran
*Assistant Examiner*—Nikhil Sriraman
(74) *Attorney, Agent, or Firm*—Patent Center LLC; Stephan A. Pendorf

(57) ABSTRACT

A large manipulator with an articulated mast (22) is pivotally connected to a mast base (21) that is rotatable about a vertical axis. The mast (22) comprises at least three mast arms (23 to 27) which are pivotable to a limited extent about horizontal articulated axis (28 to 32) that are located parallel to each other, the pivoting movement being relative to the mast base (21) or an adjacent mast arm (23 to 27) and being performed by means of a respective drive unit (34 to 38). A control unit is provided with coordinate transformer (74, 76) which responds to a given guiding parameter (r) and measured angular values ($\epsilon_\gamma$) that are determined by means of angle sensors (44 to 48) located on the mast arms (23 to 27). The coordinate transformer (74, 76) does a conversion into movement signals ($\Delta\alpha_\nu$) for the drive units (34 to 38) in accordance with predefined path/slew characteristics, the movement signals being related to the articulation axis. In order to make the inventive device lighter and easier to build, geodetic angle sensors (44 to 48) which determine earth referenced angular values ($\epsilon_\gamma$) that are assigned to the individual mast arms (23 to 27) are disposed in a rigid manner on the mast arms (23 to 27).

22 Claims, 3 Drawing Sheets

U.S. PATENT DOCUMENTS

| | | | | |
|---|---|---|---|---|
| 5,640,996 | A | 6/1997 | Schlecht | |
| 5,968,104 | A * | 10/1999 | Egawa et al. | 701/50 |
| 6,202,013 | B1 | 3/2001 | Anderson | |
| 6,263,595 | B1 * | 7/2001 | Ake | 37/348 |
| 6,341,665 | B1 * | 1/2002 | Zhou et al. | 182/2.8 |
| 6,351,696 | B1 | 2/2002 | Krasny | |
| 6,405,114 | B1 * | 6/2002 | Priestley et al. | 701/50 |
| 6,862,509 | B2 | 3/2005 | Rau et al. | |
| 6,883,532 | B2 * | 4/2005 | Rau | 137/1 |
| 2001/0045032 | A1 * | 11/2001 | Kleffner | 37/466 |
| 2004/0076503 | A1 | 4/2004 | Rau | |

FOREIGN PATENT DOCUMENTS

| | | | |
|---|---|---|---|
| DE | 195 20 166 | A | 11/1995 |
| DE | 195 03 895 | A | 8/1996 |
| DE | 100 46 546 | A | 3/2002 |
| DE | 100 60 077 | A | 6/2002 |
| JP | 2000204578 | A | 7/2000 |
| JP | 2001159518 | A | 6/2001 |
| WO | WO 02/064912 | A | 8/2002 |

* cited by examiner

DEVICE FOR ACTUATING AN ARTICULATED MAST

CROSS REFERENCE TO RELATED APPLICATION

This application is a national stage of PCT/EP 2003/006925 filed Jun. 30, 2003 and based upon DE 102 40 180.2 filed Aug. 27, 2002 under the International Convention.

BACKGROUND OF THE INVENTION

1. Field of the Invention

The invention concerns a device for actuating an articulated mast, which is preferably linked to a mast base rotatable on a chassis about a vertical axes and which includes at least three mast arms, which are limitedly pivotable relative to the mast base about parallel horizontal articulation axis or an adjacent mast arm by means of respectively one drive unit, with a control device for actuation of the drive units for movement of the mast, which includes, preferably in chassis-referenced or mast-referenced coordinate system, a coordinate transformer responsive to given guiding parameters and measured angular values determined by means of angle sensors located on the mast arms for translation into articulation movement signals relevant for the drive units in accordance with a pre-determined path/slew characteristic.

2. Related Art of the Invention

Devices of this type are employed for example in large manipulators, particularly for concrete pumps. This type of large manipulator is manipulated by an operator, who is responsible, via a remote control device, both for the control of the pump as well as for the positioning of a terminal hose provided at the tip of the articulated mast. The operator must control multiple rotational degrees of freedom of the articulated mast via the associated drive units for movement of the articulated mast in the non-structured three dimensional work space, taking into consideration the construction site boundary conditions or constraints. The control of the individual axis does have the advantage that the individual mast arms can be brought respectively individually into any desired position, limited only by their pivot range. Each axis of the articulated mast or the mast base is assigned in this case a main adjustment direction of the remote control elements of the remote control device, so that in the case of the presence of three or more mast arms the operation becomes unmanageable. The operator must continuously keep an eye on both the actuated axes as well as the end hose, in order to avoid a risk of uncontrolled movement of the end hose and therewith an endangerment of the construction site personnel.

In order to simplify manipulation in this respect, a control device has already been proposed (DE-A-4306127), in which the redundant articulation axis of the articulated mast, in each rotation position of the mast base independent of the rotation axis thereof, are controlled conjunctively with one single control movement of the control element. Therein the articulated mast carries out an extension and retraction movement overseeable by the operator, wherein the elevation of the mast tip is maintained constant. In order to make this possible, this control device includes a computer supported coordinate transformer for the drive units controllable via the remote control element, via which in the one main adjustment direction of the remote control element the drive units of the articulated axes are controllable independent of the drive unit of the rotation axes of the mast base with carrying out of an extension and retraction movement of the articulated mast with predetermined height of the mast tip. In another main adjustment direction or main positioning direction the drive units of the articulated axes are controllable independent of the drive units of the rotation axis with carrying out of a raising and lowering movement of the mast tip. For optimization of the movement sequence during the extension or retraction process it is there considered to be important that the drive units of the redundant articulated axes of the articulated mast are respectively controllable in accordance with a path/slew characteristic. Included therein is that the path/slew characteristic in the coordinate transformer is modified due to the influence of bending or torsional moments acting on the individual mast arms.

In order to detect the movement sequences in the articulated mast, angular sensors are provided on the mast arms for determining the articulation angle. The individual angle sensors respectively measure only the articulation angle between two mast arms of one articulation axis. This type of angular measurement is robust, since the system is relatively stiff in the axis area and since the angle sensor provides the actual articulation angle with great precision. The axis associated measurement value is independent of the measurement values at the other axes. Thereby, one obtains a relatively simple mathematical relationship between the articulation angles on the one hand and the instantaneous position of the end hose on the other hand. One refers to this as a coordinate transformation between the articulation axis-associated angle coordinates and the chassis-based cylinder coordinates, in which the end hose of the device is being moved.

The articulation axis related angular measurement value is also independent of the bending of the individual mast arms due to the loads acting thereon. The bending must supplementally be mathematically taken into consideration. For this, one must first determine the mass of the individual arm parts and therein, in particular, filling of the associated distribution pipes with concrete. The bending is then input purely mathematically into the coordinate transformation. This is considered disadvantageous.

On the other hand, it has been found advantageous, in the dynamic respect, that the articulation axis related angular measurements do not contain any information components regarding the swivel condition itself, so that, with regard to the angular measurements, a dynamic decoupling occurs. The relatively stable axis angles thus make possible an error magnitude feedback relying on supplemental information regarding the swivel condition in the individual axes, for example, the dynamic pressure progression in associated control cylinders. Therewith, an effective oscillation damping is made possible (see DE-A-10046546).

The known device, in which the mast arm angle is measured in an articulation axis referenced chassis-based coordinate system, has the following disadvantages:

a) The assembly of the angle sensors in the area of the articulation axes is laborious, since the design provides for many components to already be located in the area of the axis, which interfere with the attachment of the angle sensor.

b) The weight of the axis-associated angle sensor inclusive of cabling is approximately 50 Kg per axis, which is relatively high.

c) With the articulation axis associated angle sensors only the articulation axes are measured, and this without taking into consideration the bending of the individual mast arms. For the bending due to the torsional moments, with and without filling of the distribution pipes with concrete, a supplemental mathematical model is necessary, which can introduce errors.

SUMMARY OF THE INVENTION

Beginning therewith it is the task of the invention to develop a device for controlling an articulated mast, in particular for large scale manipulators, for which the measuring devices (sensors), securing components and cabling exhibit a lower weight and are mountable in simple manner, and with which it is also possible to detect and use, in the control technology, information detectable by the measurement technology regarding the bending of the mast arms and the dynamics of the system.

For solving this task there is provided a large manipulator with an articulated mast pivotally connected to a mast base that is rotatable about a vertical axis. The articulated mast comprises at least three mast arms which are pivotable to a limited extent about horizontal articulated axis and located parallel to each other, the pivoting movement being relative to the mast base or an adjacent mast arm and being performed by means of a respective drive unit. The inventive device further comprises a control unit for actuating the drive units for the mast movement. The control unit is provided with coordinate transformer which responds to a given guiding parameter (r) and measured angular values ($\epsilon_\gamma$) that are determined by means of angle sensors located on the mast arms. The coordinate transformer does a conversion into movement signals ($\Delta\alpha_v$) for the drive units in accordance with predefined path/slew characteristics, the movement signals being related to the articulation axis. In order to make the inventive device lighter and easier to build, geodetic angle sensors which determine geostationary measured angular values ($\epsilon_\gamma$) that are assigned to the individual mast arms are disposed in a rigid manner on the mast arms.

In accordance with a first embodiment of the invention geodetic angle sensors are inelastically provided on the mast arms, preferably away from the articulation axes, for determination of the individual mast arm associated geographically referenced angular measurement values. In order to also be able to take into consideration in the coordinate transformation a non-horizontal orientation of the mast base and the chassis which carries this, it is advantageous to provide at least one geodetic angle sensor on the mast base and/or on the chassis for measuring a geographically referenced or fixed angular measurement value associated with the mast base and/or the chassis.

In accordance with a preferred embodiment of the invention the geodetic angle sensors are tilt angle sensors sensitive to the gravitation of the earth.

The geographically referenced or referenced angular measurement values determined with the inventive geodetic angle sensors can be evaluated or utilized in various manners in the inventive control device:

a) Statically the individual articulation angles can be calculated or worked out therefrom. Having the articulation angles, then the relationship to the chassis fixed cylinder coordinates can be produced. The conventional coordinate transformation determines, from the articulation angles, the orientation of the individual mast arms in space, and from this, the instantaneous position of the end hose in the radial direction and the height above the substrate.

b) The inventive geodetic angle measurement values of the mast arms can also be converted directly, without the detour over the articulation angles, into the cylinder coordinates of the end hose.

c) In both cases a) and b) the static deformation effects due to the load or torsional moments are already contained in the measurement values. Even a setup tilt attributable to a deformation in the substrate or undercarriage is already taken into consideration.

d) During opening up and folding together of the articulated mast the angle positions in the articulation axes according to a) must be known, so that the mast arms can be moved relative to each other free of collision. This includes also collision with self, namely the collision between the individual mast arms and their add-on components.

In order to make all of this possible it is proposed in accordance with an advantageous embodiment of the invention that the coordinate transformer includes a software routine for conversion of geographically referenced or fixed mast arm related angle measurement values into articulation angles. In addition, the coordinate transformer should include a software routine for conversion of the guidance parameters into guidance articulation angles in the chassis fixed cylinder coordinate system in accordance with a predetermined path/slew characteristic of the articulated mast.

In the use of geodetic angle sensors on the mast arms the inclination or tilting of the preceding arms and their changes act directly on the angle measurement values of the subsequent arms. Thus in the case of the first mast arm is changed in its angle of inclination, then also the inclination of the following mast arms change by a corresponding amount. This is to be taken into consideration not only in the stationary condition, but rather also in dynamic inclination changes. Weight effects or inertial effects, which appear in the case of these changes, distribute themselves dynamically upon the individual mast arms. During the coordinate transformation it must be distinguished whether the tilt angle change is attributable to the measurement arm itself or to a preceding mast arm. This leads to the allocation problem: For each measured angular change at the individual mast arms it must be determined which change component concerns which mast arm. For this, a mathematical model is necessary, which brings about a decoupling of the geodetic angle measurements in the individual mast arms. According to the invention, for this a dynamic decoupling of the signals, converted to the articulation axes referenced angular coordinates, is carried out. For this there is provided, in accordance with the invention, a software routine responsive to the dynamic angle measurement values for their apportionment into low frequency and high frequency angle measurement components. Further, in accordance with a preferred embodiment of the invention, a group of articulation axis referenced control comparisons are provided, which are acted upon by the stationary or low frequency components of the articulation angle as actual or instantaneous values and with the guidance articulation angle as set or desired value and which, on the output side, are connected with the articulation axes referenced guidance parameter controller for controlling the drive units of the concerned articulation axes.

According to a further preferred embodiment of the invention a group of articulation axis referenced disturbance amplitude controllers is provided, which are acted upon with the articulation axis related high frequency components of the dynamic angle measurement values and which are connected to the signal inputs of the associated drive units of the articulated axes with formation of an error value circuit input. In this case, preceding the error value controller, there can be a software routine responsive to the dynamic geographic-based angle measurement value and the summed high frequency component of the articulation angle for determining the high frequency component of the individual articulation angle.

The presently described disassembly or deconstruction of the dynamic angle measurement values leads thereto, that various control signals are assigned to different categories, and are evaluated in different control circuits: A guide value controller, which influences the guide relationship or behavior input by the operator and an error value controller, which influences the oscillation behavior. The two control groups are acted upon with the instantaneous value components from this disassembly. The set or desired values of the guidance value controller are produced from the incoming data, for example, of a joy stick, thus from the input of the operator, with supplemental taking into consideration a preset path/slew characteristic, while the sub-divided out error or interference values are controlled via the error or interference value controller for the purpose of controlling the oscillation dampening to zero. The guidance behavior includes, in accordance with the invention, supplementally the static deformation of the mast arms and the setp-up tilt of the chassis or base frame.

A second alternative solution is comprised therein, that on the mast arms respectively one satellite supported GPS-module (Global Positioning System) is provided inelastically for determining of the individual mast arm associated geographically referenced position measurement values, wherein the coordinate transformer can be acted upon with the position measurement values of the GPS modules. Preferably there is provided a mast base associated GPS-module and, in certain cases, at least one chassis associated GPS-module for determining of the mast base and/or the chassis associated geographically referenced position measurement values. The geographically referenced mast arm related position measurement values are preferably transformed or converted with the aid of a software routine of the coordinate transformer into articulation angles. Preferably the coordinate transformer additionally includes a software routine for conversion of the guidance values, in accordance with a predetermined path/slew characteristic of the articulation mast, into chassis fixed guidance articulation angles. When the position measurement values also include dynamic position information with sufficiently high frequency, it is advantageous to provide a software routine responsive to the dynamic position measurement values for their division into low frequency and high frequency position measurement value components. In this case it is advantageous when a group of control comparers is provided, which are acted upon with the stationary or low frequency components of the articulation angle as instantaneous value and the guidance articulation angles as set or desired values and are connected on the output side with an articulation axes referenced guidance value controller for controlling the drive units of the concerned articulation axes. The guidance value or magnitude controllers ensure that the inputs or commands of the operator, for example, with the aid of a joystick, are converted into the desired retraction or extension movement of the articulated mast. For oscillation damping there can also be supplementally provided a group of articulation axes referenced error amplitude or interference magnitude controllers, which can be acted upon with the articulation axes referenced high frequency component of the dynamic angle measurement values, and which are connected to the signal inputs of the associated drive units of the articulated axes with formation of an error magnitude circuit input. The error magnitude controllers are preferably preceded by a software routine responsive to the dynamic geographically referenced position measurement values and the summed high frequency component of the articulation angle, for determining the articulation axes referenced high frequency component of the articulation angle.

BRIEF DESCRIPTION OF THE DRAWINGS

In the following the invention will be described in greater detail on the basis of an illustrative embodiment shown in schematic manner in the figures. There is shown.

DETAILED DESCRIPTION OF THE INVENTION

Figure 1:
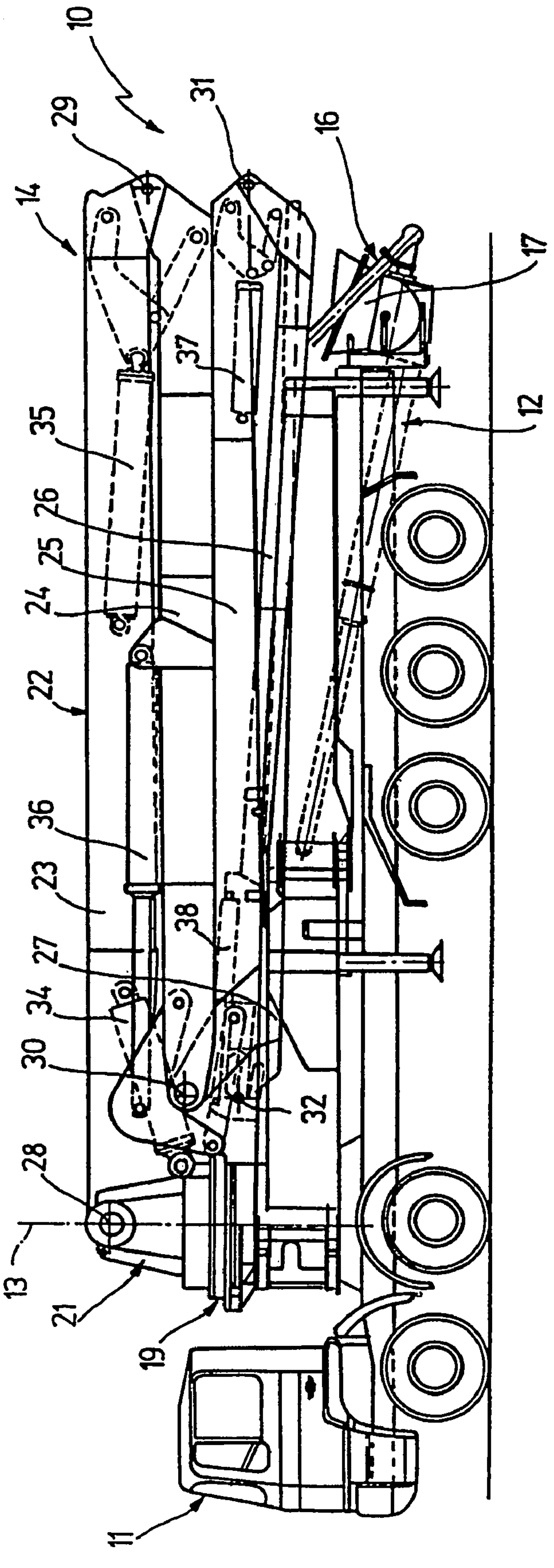
FIG. 1 a side view of a mobile concrete pump with associated articulated mast.

The mobile concrete pump 10 includes a vehicle chassis 11, a thick matter pump 12 which may be, for example, a two cylinder piston pump, as well as a concrete distribution mast 14 as carrier for a concrete conveyance conduit 16. Liquid concrete, which is continuously introduced into a receptacle container 17 during concretizing, is conveyed via the concrete conveyance conduit 16 to a concretizing location 18 at a distance from the location of the vehicle 11. The distribution mast 14 is comprised of a mast base 21 rotatable about the vertical axis 13 via a hydraulic rotation drive 19 and an articulation mast 22 pivotable thereon, which is continuously adjustable to different reach and height differentials between the vehicle 11 and the concretizing location 18. The articulated mast 22 is comprised in the illustrated example of five mast arms 23 to 27 connected articulated with each other, which are pivotable about axes 28 through 32 running parallel to each other and at right angles to the vertical axis 13 of the mast base 21. The articulation angles $\alpha_1$ through $\alpha_5$ (FIG. 2) of the articulation linkages formed by the articulation axes 28 through 32 and their arrangement or disposition relative to each other are so coordinated relative to each other, that the distribution mast can be folded into the multiply folded room saving transport configuration on the vehicle 11 as seen in FIG. 1. By the activation of the drive units 34 through 38, which are associated with the individual articulation axes 28 through 32, the articulated mast 22 can be unfolded into various distances r and/or height differentials h between the location to be concreted 18 and the vehicle location (FIG. 2).

The operator controls the movement of the mast using a wireless remote control device 50, via which the mast tip 33 with the end hose 42 is moved over the area to be supplied with concrete. The end hose 42 has a typical length of 3 to 4 m and can, due to its articulated hanging in the area of the mast tip 33 and on the basis of its inherent flexibility, be held by a hose man with its output end in a desired position relative to the location to be supplied with concrete 18.

Figure 2:
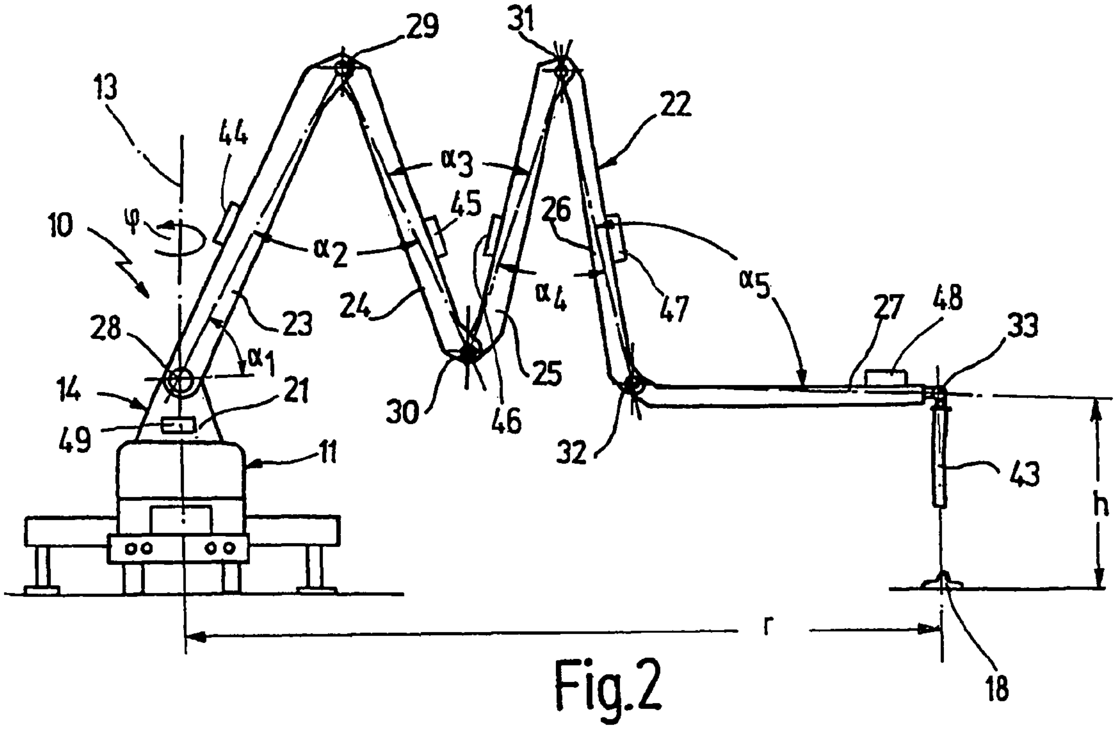
FIG. 2 the mobile concrete pump according to FIG. 1 with articulated mast in the work position.
Figure 3:
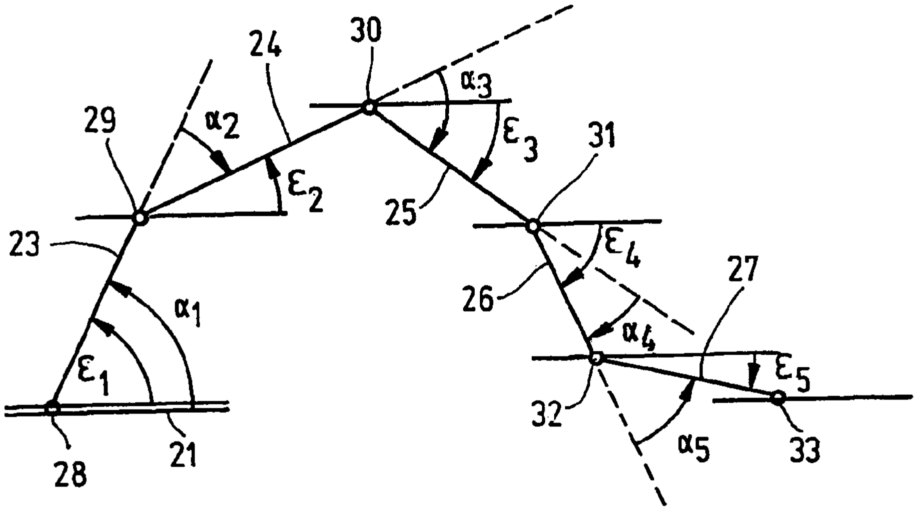
FIG. 3 a schematic of the transformation of the geodetic (geographically referenced) angle measurement value into articulation axes based angle measurement values.

As can be seen in FIG. 2, a geodetic angle sensor 44 through 48 is rigidly (inelastically) provided on each mast arm 23 through 27 for determining the individual mast arm associated geographic referenced angle measurement values $\epsilon_\nu$ (see FIG. 3). A further geodetic angle sensor 49 is located on the mast base 21. Therewith the tilt of the chassis vertical axis 13 relative to the vertical, and therewith the also the tilt of the vehicle chassis relative to the substrate, can be measured. The angle sensors 44 through 48 will replace the articulation axes based angle sensors provided in the conventional articulated mast control device.

As can be seen from FIG. 3, in the stationary condition the articulation axes based articulation angles $\epsilon_\nu$ can be calculated from the geographically referenced angles $\epsilon_v$ of the mast arms determined by the geodetic angle sensors 44 through 48 as follows:

$$\alpha_v = \varepsilon_v - \sum_{n=1}^{v-1} \alpha_n$$

when v>1 and $\alpha_1 = \epsilon_1$ when v=1, wherein the setup tilt angle is assumed to be zero. The geodetic angle sensors 44 through 49 preferably provide tilt angle signals responsive to the gravity to the earth. Since the angle sensors are provided on the mast arms 23 through 27 outside of the articulation axes 28 through 32, their measurement values include additional information components regarding the bending of the mast system and the dynamic oscillation condition. Further contained in the measurement values is also information regarding the setup tilt and the deformation in the base frame or body, which can be separated using a supplemental measurement cite 49 on the mast base or the chassis.

Figure 4:
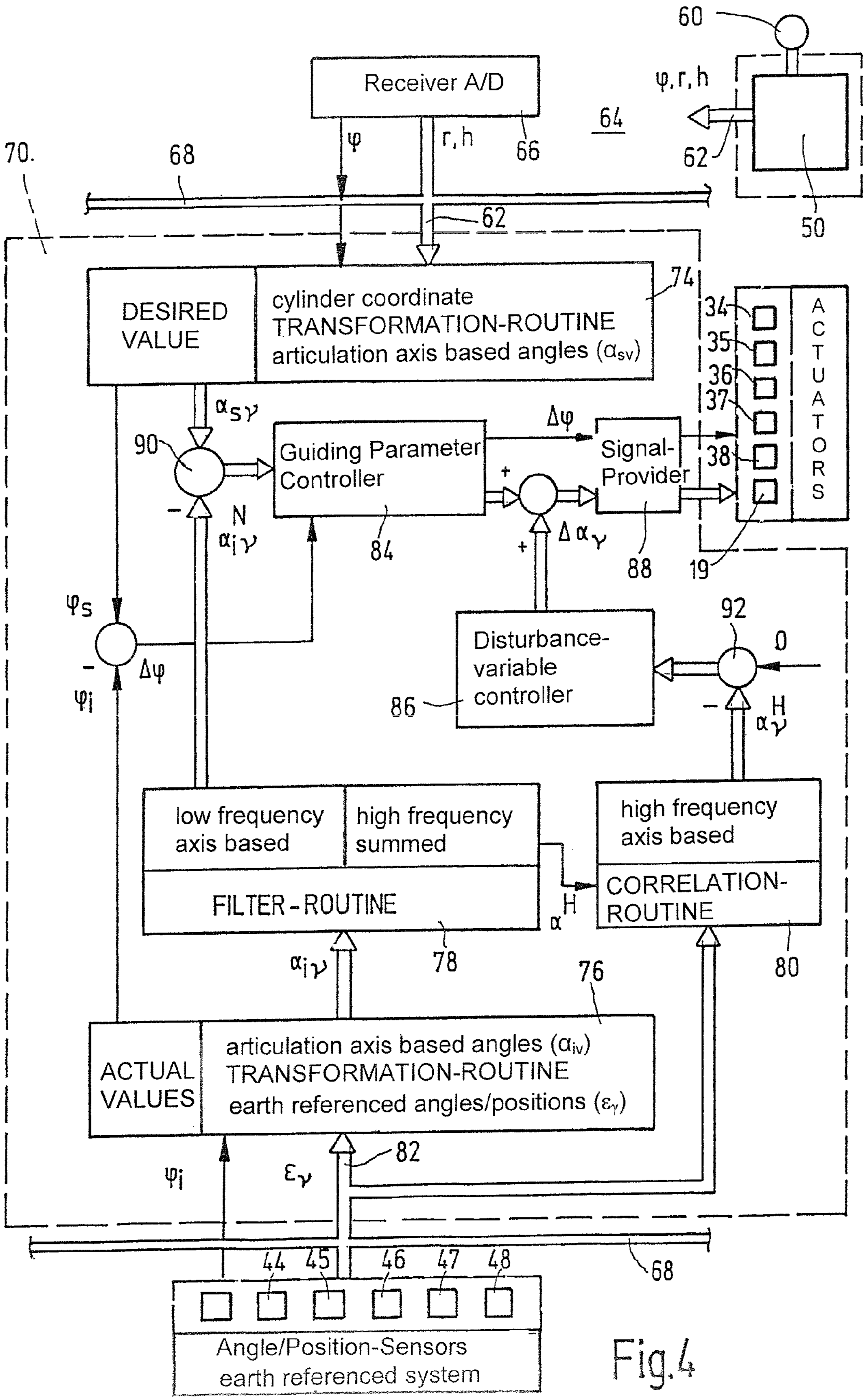
FIG. 4 a schematic of a device for control or operation of the articulated mast.

The remote control device 50 includes in the embodiment shown in FIG. 4 at least one remote control element 60 in the form a control lever, which can be moved back and forth in three main directions with output of control signals 62. The control signals 62 are transmitted over a radio path 64 to a vehicle mounted radio receiver 66, which is connected on the output side via a, for example, CAN-Bus type Bus system 68, to a microcontroller 70. The microcontroller 70 contains software modules 74, 76, 78, 80 via which the control signals 62 ($\phi$, r, h) received from the remote control device 50 and the measurement signals 82 ($\epsilon_v$) received from the geodetic angle sensors 44 through 48 are interpreted, transformed and, via an operating command or steering value controller 84, an error value controller 86 and a downstream signal provider 88, are converted into actuation or operation signals ($\Delta\alpha_v$) for the drive units 34 through 38 (actuators) of the articulation axes 28 through 32.

In the shown illustrative embodiment the output signals of the remote control element 60 are interpreted into the three main servo or control directions "advance/retract tilting" for adjusting the radius r of the mast tip 33 from the rotation axis 13 of the mast base, "right/left tiling" for controlling the rotation axes 13 of the mast base 21 about the angle $\phi$ and "right/left rotation" for adjusting the height h of the mast tip 33 above the location to be supplied with concrete 18. The deflection of the remote control element 60 in the respective directions is converted in a not shown interpretation routine into a speed signal, wherein a boundary value data ensures that the movement speed of the axes and the acceleration thereof does not exceed a preset maximal value (see DE-A-10060077).

The software module 74 labeled "transformation routine" has the task of transforming, in predetermined time clock pulses, the incoming control signals (desired values), interpreted as cylinder coordinates $\phi$, r, h, into angle signals $\phi_s$, $\alpha_{sv}$ for the rotation and articulation axes 13, 28 through 32. Each articulation axes 28 through 32 is so controlled by software within the transformation routine 74 with utilization of a predetermined path/slew characteristic, that the articulation linkages, depending upon the path and time, move harmonically relative to each other. The control of the redundant degrees of freedom of the articulation linkages occurs therewith according to a preprogram strategy via which it is also possible to eliminate the possibility of a self-collision with adjacent mast arms 23 through 27 during the sequence of movement.

The geodetic angle sensors 44 through 48 measure, in a predetermined clock cycle, the instantaneous geographically referenced angle $\epsilon_v$ and transmit the measurement value over the bus system 68 to the microcontroller 74. The measurement values $\epsilon_v$ are converted in the software module 76 into the articulation angle instantaneous values $\alpha_{iv}$. The time dependent articulation angles are then distributed or subdivided in the software module 78, labeled "filter routine", into low frequency (quasi stationary) articulation angles $\alpha_{iv}^N$ and into a high frequency summed articulation angle signal $\alpha^H$. The low frequency axes associated articulation angle instantaneous values $\alpha_{iv}^N$ are compared in the control comparator 90 with the set or desired values $\alpha_{sv}$ and used via the guidance value controller 84 and the signal provider 88 for controlling the valves or magnitudes going to the drive units 34 through 38. The high frequency summed component $\alpha^H$ is converted, using the geographically referenced mast related angle measurement value $\epsilon_v$, in a software module 80 labeled as "correlation routine", into high frequency articulation axes related interference or error magnitude signals $\alpha^H$, which via a control comparer 92 and the error value controller 86 are supplied to the signal provider 88 in the sense of an error value circuit entry, and thereby are adjusted to zero.

It is basically possible, in place of the geodetic angle sensors, to also provide satellite controlled GPS-position sensors on the mast arms. The therewith measured position values as instantaneous values can be converted by suitable transformation routines 76 into articulation angles and in like manner be evaluated as the geographically referenced angle measurement values with the microcontroller 70.

In summary the following can be concluded: The invention relates to a device for actuating an articulated mast particularly for large manipulators and concrete pumps. Said articulated mast 22 is pivotally connected to a mast base 21 that is rotatable about a vertical axis and comprises at least three mast arms 23 to 27 which are pivotable to a limited extent about horizontal articulated axis 28 to 32 that are located parallel to each other, the pivoting movement being relative to the mast base 21 or an adjacent mast arm 23 to 27 and being performed by means of a respective drive unit 34 to 38. The inventive device further comprises a control unit for actuating the drive units for the mast movement. The control unit is provided with coordinate transformer 74, 76 which responds to a given guiding parameter r and measured angular values $\epsilon_\gamma$ that are determined by means of angle sensors 44 to 48 located on the mast arms 23 to 27. The coordinate transformer 74, 76 does a conversion into movement signals $\Delta\alpha_v$ for the drive units 34 to 38 in accordance with predefined path/slew characteristics, said movement signals being related to the articulation axis. In order to make the inventive device lighter and easier to build, geodetic angle sensor 44 to 48 which determine geostationary measured angular values $\epsilon_\gamma$ that are assigned to the individual mast arms 23 to 27 are disposed in a rigid manner on the mast arms 23 to 27.

The invention claimed is:

1. A large manipulator with an articulated mast (22), which is linked to a mast base (21) rotatable about a vertical axis (13) on a chassis (11), the articulated mast having one end connected to the mast base with the other end being a free end (27) ending in a mast tip (33), the large manipulator comprising at least three mast arms (23 to 27) limitedly pivotable about respectively parallel horizontal articulation axis (28 to 32) relative to the mast base (21) or an adjacent mast arm (23 to 27) via a respective drive unit (34 to 38), a control unit (70) configured to actuate the drive units (34 to 38) for mast movement, the control unit including a coordinate transformer (74, 76) that responds to guiding parameters (r, h) for the mast tip (33) or for an end hose (43) located thereon, and to measured angular values that are determined by means of angle sensors (44 to 48) on the mast arms (23 to 27) for translation into articulation axis referenced movement signals ($\Delta\alpha_v$) for the drive units (34 to 38) in accordance with predefined path/slew characteristics, wherein geodetic angle sensors (44 to 48) which determine earth referenced angular values ($\epsilon_v$) of the individual mast arms (23 to 27) are disposed in a rigid manner on the mast arms (23 to 27) away from the articulation axis, and wherein the coordinate transformer is fed with the measured angular values ($\epsilon_v$) of the geodetic angle sensors (44 to 48).

2. The large manipulator according to claim 1, wherein the guiding parameters (r, h) for the mast tip (33) or for an end hose (43) are provided in a chassis-referenced coordinate system.

3. The large manipulator according to claim 1, wherein in addition a geodetic angle sensor (49) is provided on the mast base (21) for measurement of an earth referenced angle value associated with the mast base (21).

4. The large manipulator according to claim 1, wherein at least one geodetic angle sensor is provided on the chassis (11) for measurement of at least one earth referenced angle value associated with the chassis.

5. The large manipulator according to claim 1, wherein the geodetic angle sensors (44 through 48) are tilt angle sensors responsive to the gravity of the earth.

6. The large manipulator according to claim 1, wherein the coordinate transformer includes a software routine (76) for conversion of earth referenced mast arm base angle values ($\epsilon_v$) into articulation angles ($\alpha_{iv}$).

7. The large manipulator according to claim 1, wherein the coordinate transformer includes a software routine for translating earth referenced mast arm base angle values ($\epsilon_v$) into chassis referenced cylinder coordinates (r, h) for the mast tip or the end hose.

8. The large manipulator according to claim 1, wherein the coordinate transformer includes a software routine (74) for conversion of the guide or command value (r) into command articulation angles ($\alpha_{sv}$) in accordance with a predetermined path/slew characteristic of the articulated mast (22).

9. The large manipulator according to claim 1, wherein a software routine (78) responsive to dynamic angle measurement values ($\alpha_{iv}$) is provided for the dividing thereof into low frequency and high frequency angle measurement value components.

10. The large manipulator according to claim 9, wherein a group of articulation axes referenced control comparers (90), which are fed with stationary or low frequency measurement component ($\alpha_{iv}^N$) of the articulation axes based articulation angles ($\alpha_{iv}$) as instantaneous values and the articulation axes based guide articulation angles ($\alpha_{iv}$) as set or desired values, and which are connected on the output side with an articulation axes based command variable controller (84) for control or actuation of the drive units (34 through 38) of the associated articulation axes (28 through 32).

11. The large manipulator according to claim 9, wherein a group of articulation axes based or referenced error value controllers (86), which are acted upon with the articulation axes high frequency component ($\alpha_v^H$) of the articulation angle and which are connected to the signal inputs (88) of the associated drive units (34 through 38) of the articulation axes (28 through 32) with formation of an error magnitude input circuit.

12. The large manipulator according to claim 11, wherein the error magnitude controllers (86) are preceded by a software routine (80) responsive to the earth referenced angle measurement values ($\epsilon_v$) and the high frequency summed component ($\alpha^H$) of the articulation angles for determining the articulation axes based high frequency component ($\alpha_v^H$) of the articulation angles.

13. A large manipulator comprising:

a chassis (11), a mast base (21) on the chassis (11), an articulated mast linked to the mast base (21) and rotatable about a vertical axis (13), the articulated mast (22) having a free end (27) ending in a mast tip (33) and comprising at least three mast arms (23 to 27) limitedly pivotable about respectively parallel horizontal articulation axis (28 to 32) relative to the mast base (21) or an adjacent mast arm (23 to 27) via a respective drive unit (34 to 38), a control unit (70) configured to actuate the drive units (34 to 38) for mast movement, the control unit including a coordinate transformer (74, 76) which responds to guiding parameters (r, h) for the mast tip (33) or for an end hose located thereon and to measured angular values that are determined by means of angle sensors (44 to 48) on the mast arms (23 to 27) away from the articulation axis for translation into articulation axis referenced movement signals ($\Delta\alpha_v$) for the drive units (34 to 38) in accordance with predefined path/slew characteristics, wherein one GPS-module is rigidly provided on each mast arm for determining the earth referenced position measurement value of the individual mast arms, and wherein the coordinate transformer is fed with the position measurement values of the GPS module.

14. The large manipulator according to claim 13, wherein the guiding parameters (r, h) for the mast tip (33) or for an end hose (43) are provided in a chassis-referenced coordinate system.

15. The large manipulator according to claim 13, wherein in addition a GPS module is associated with the mast base for measurement of an earth referenced position measurement value associated with the mast base.

16. The large manipulator according to claim 13, wherein in addition at least one GPS module is provided associated with the chassis for measurement of at least one chassis associated earth referenced position measurement value.

17. The large manipulator according to claim 13, wherein the coordinate transformer includes a software routine (74) for conversion of earth referenced mast arm based position measurement values into articulation angles ($\alpha_{iv}$).

18. The large manipulator according to claims 13, wherein that the coordinate transformer includes a software routine (74) for conversion of the guide or command value (r, h) into guide articulation angles ($\alpha_{sv}$) in accordance with a predetermined path/slew characteristic of the articulated mast (22).

19. The large manipulator according to claim 13, wherein a software routine (78) responsive to the dynamic position measurement values, for their distribution or subdivision into low frequency and high frequency position measurement components.

20. The large manipulator according to claim 17, wherein a group of articulation axes based control comparers (90), are fed stationary or low frequency components ($\alpha_{iv}^N$) of the articulation angle ($\alpha_{iv}$) as instantaneous values and the command angles ($\alpha_{sv}$) as desired or set values and which, on the output side, are connected with respectively one articulation axes based command variable controller (84) for actuating the drive units of the associated articulation axes (28 through 32).

21. The large manipulator according to claim 18, wherein a group of articulation axes associated error value controllers (86), which can be acted upon with the articulation axes based high frequency components ($\alpha_v^H$) of the articulation angles and which are connected to the signal inputs (88) of the associated drive units (34 through 38) of the articulation axes (28 through 32) with formation of an error magnitude circuit input.

22. The large manipulator according to claim 21, wherein the error value controllers (86) are preceded with a software routine (80), responsive to the earth referenced position measurement values and the high frequency component ($\alpha^H$) of the articulation angle, for determining the articulation axes based high frequency component ($\alpha_v^H$) of the articulation angle.

* * * * *